US012776140B2

(12) United States Patent
Kunde et al.

(10) Patent No.: US 12,776,140 B2
(45) Date of Patent: Oct. 27, 2026

(54) DISTRIBUTED ARCHITECTURE FOR FUSION-TRANSFORMER TRAINING ACCELERATION

(71) Applicant: Tata Consultancy Services Limited, Mumbai (IN)

(72) Inventors: Shruti Kunal Kunde, Thane (IN); Ravi Kumar Singh, Thane (IN); Chaman Banolia, Pune (IN); Rekha Singhal, Thane (IN); Balamuralidhar Purushothaman, Bangalore (IN); Shailesh Shankar Deshpande, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 243 days.

(21) Appl. No.: 18/742,019

(22) Filed: Jun. 13, 2024

(65) Prior Publication Data

US 2024/0420464 A1 Dec. 19, 2024

(30) Foreign Application Priority Data

Jun. 17, 2023 (IN) ............................ 202321041264

(51) Int. Cl.
*G06V 20/10* (2022.01)
*G06V 10/26* (2022.01)
(Continued)

(52) U.S. Cl.
CPC ............ *G06V 20/194* (2022.01); *G06V 10/26* (2022.01); *G06V 10/762* (2022.01);
(Continued)

(58) Field of Classification Search
CPC .. G06V 10/7715; G06V 10/803; G06V 10/26; G06V 10/10762; G06V 10/10764;
(Continued)

(56) References Cited

PUBLICATIONS

Aspri, Maria, Grigorios Tsagkatakis, and Panagiotis Tsakalides. "Distributed training and inference of deep learning models for multi-modal land cover classification." Remote Sensing 12.17 (2020): 2670. (Year: 2020).*

(Continued)

*Primary Examiner* — Tracy Mangialaschi
(74) *Attorney, Agent, or Firm* — Finnegan, Henderson, Farabow, Garrett & Dunner LLP

(57) ABSTRACT

The disclosure addresses problems associated with a systematic integration of multi-modal data for effective training, and handling of large volume of data because of high resolution of the multiple modalities. Embodiments herein provide a method and a system for a distributed training of a multi-modal data fusion transformer. Herein, a distributed training approach called a Distributed Architecture for Fusion-Transformer Training Acceleration (DAFTA) is proposed for processing large multimodal remote sensing data. DAFTA is enabled to handle any combination of remote sensing modalities. Additionally, similarity of feature space is leveraged to optimize the training process and to achieve the training with reduced data set which is equivalent to a complete data set. The proposed approach provides a systematic and efficient method for managing large sensing data and enables accurate and timely insights for various applications.

9 Claims, 4 Drawing Sheets

(51) Int. Cl.
*G06V 10/762* (2022.01)
*G06V 10/764* (2022.01)
*G06V 10/766* (2022.01)
*G06V 10/77* (2022.01)

(52) U.S. Cl.
CPC .......... *G06V 10/764* (2022.01); *G06V 10/766* (2022.01); *G06V 10/7715* (2022.01)

(58) Field of Classification Search
CPC ... G06V 10/766; G06V 20/194; G06F 18/253
See application file for complete search history.

(56) References Cited

PUBLICATIONS

Zhang Y, Xu S, Hong D, Gao H, Zhang C, Bi M, Li C. Multimodal transformer network for hyperspectral and LiDAR classification. IEEE Transactions on Geoscience and Remote Sensing. Jun. 7, 2023;61. (Year: 2023).*
Aspri et al., "Distributed Training and Inference of Deep Learning Models for Multi-Modal Land Cover Classification," Remote Sens., 12 (2020).
Li et al., "Hyperspectral and LiDAR Data Fusion Classification Using Superpixel Segmentation-Based Local Pixel Neighborhood Preserving Embedding," Remote Sens., 11 (2019).
Roy et al., "Multimodal Fusion Transformer for Remote Sensing Image Classification," (2023).
Zhu et al., "Deformable Convolutional Neural Networks for Hyperspectral Image Classification," (2018).

* cited by examiner

DISTRIBUTED ARCHITECTURE FOR FUSION-TRANSFORMER TRAINING ACCELERATION

PRIORITY CLAIM

This U.S. patent application claims priority under 35 U.S.C. § 119 to Indian application No. 202321041264, filed on Jun. 17, 2023. The entire content of the abovementioned application is incorporated herein by reference.

TECHNICAL FIELD

The disclosure herein generally relates to the field of distributed training of a deep learning model, and, more particularly, to a method and a system for a distributed training of a multi-modal data fusion transformer.

BACKGROUND

Remote sensing refers to the acquisition of information about the earth's systems without being in direct physical contact with. It is commonly performed by mounting sensors on platforms such as aircraft or satellites. Passive remote sensing which uses the reflected solar light from the target capture images in visible, multi-spectral, or hyperspectral (HS) mode. HS imaging sensors capture data in hundreds or even thousands of narrow, contiguous bands, which allow highly detailed analysis of the reflectance properties of a surface. Active sensors such as Lidar, on the other hand, use laser to measure the distance between the sensor and the Earth's surface, thus creating highly accurate 3D maps of the terrain.

The field of remote sensing has seen an explosion of the data in recent years, with numerous sensors capturing vast amounts of information across various modalities. Land use and land cover classification is the mainstay of the analysis methods. Given a small set of training pixels in an image, the task is to predict labels of remaining pixels in the image. Also, as geographic features are similar in a given location, remote sensing image classification becomes region-specific, and models require to be trained frequently in time and space. For e.g., Monitoring encroachment by mining fields, global deforestation, methane gas leakage over a large area, and so on. The analysis of such data has become a critical component in the day-to-day business decision-making process. However, processing of large amounts of multi-modal data is critical for realizing foreseen improvements in discrimination of various targets. The key ingredient of delivering useful deep learning solutions is managing computational complexity of the training and deployment in such a scenario.

SUMMARY

Embodiments of the present disclosure present technological improvements as solutions to one or more of the above-mentioned technical problems recognized by the inventors in conventional systems. For example, in one embodiment, a method for a distributed training of a multi-modal data fusion transformer is provided. The processor-implemented method includes receiving, via an input/output interface, a plurality of multimodal remote sensing data comprising a plurality of hyperspectral images (HSI), and a plurality of Light Detection and Ranging (LiDAR) images of a predefined geographical region. Further, the processor-implemented method includes dividing each of the plurality of HSI into a plurality of HSI patches, and each of the plurality of LiDAR images into a plurality of LiDAR patches. The plurality of HSI patches and the LiDAR patches are converted into a plurality of HSI patch vectors and LiDAR patch vectors by convolving through one or more predefined filters.

Further, the processor-implemented method comprises distributing each of the plurality of HSI patch vectors and each of the plurality of LiDAR patch vectors among a plurality of computing nodes of a multi-modal data fusion transformer model. Furthermore, the processor-implemented method comprises processing the distributed plurality of HSI patch vectors and the plurality of LiDAR patch vectors to generate a plurality of classification (CLS) token embeddings. Finally, the processor-implemented method comprises training the multi-modal data fusion transformer model by performing a logistic regression on the generated plurality of CLS token embeddings.

In another aspect, a system for a distributed training of a multi-modal data fusion transformer is provided. The system comprises a memory storing a plurality of instructions and one or more Input/Output (I/O) interfaces to receive a plurality of multimodal remote sensing data comprising a plurality of hyperspectral images (HSI), and a plurality of Light Detection and Ranging (LIDAR) images of a predefined geographical region. Further, the system comprises one or more hardware processors coupled to the memory via the one or more I/O interfaces, wherein the one or more hardware processors are configured by the instructions to divide each of the plurality of hyperspectral images (HSI) into a plurality of HSI patches, and each of the plurality of Light Detection and Ranging (LiDAR) images into a plurality of LiDAR patches. Further, the one or more hardware processors are configured to convert the plurality of HSI patches and the LiDAR patches into a plurality of HSI patch vectors and LiDAR patch vectors by convolving through one or more predefined filters. Furthermore, the one or more hardware processors are configured to distribute each of the plurality of HSI patch vectors and each of the plurality of LiDAR patch vectors among a plurality of computing nodes of a multi-modal data fusion transformer model.

Further, the one or more hardware processors are configured to process the distributed plurality of HSI patch vectors and a plurality of LiDAR patch vectors to generate a plurality of classification (CLS) token embeddings. Finally, the one or more hardware processors are configured to train the multi-modal data fusion transformer model by performing a logistic regression on the generated plurality of CLS token embeddings.

In yet another aspect, there are provided one or more non-transitory machine-readable information storage mediums comprising one or more instructions, which when executed by one or more hardware processors causes a method for a distributed training of a multi-modal data fusion transformer is provided. The processor-implemented method includes receiving, via an input/output interface, a plurality of multimodal remote sensing data comprising a plurality of hyperspectral images (HSI), and a plurality of Light Detection and Ranging (LiDAR) images of a predefined geographical region. Further, processor-implemented method includes dividing each of the plurality of hyperspectral images (HSI) into a plurality of HSI patches, and each of the plurality of Light Detection and Ranging (LiDAR) images into a plurality of LiDAR patches. The plurality of HSI patches and the LiDAR patches are converted into a plurality of HSI patch vectors and LiDAR patch vectors by convolving through one or more predefined filters.

Further, the processor-implemented method comprises distributing each of the plurality of HSI patch vectors and each of the plurality of LiDAR patch vectors among a plurality of computing nodes of a multi-modal data fusion transformer model. Furthermore, the processor-implemented method comprises processing the distributed plurality of HSI patch vectors and a plurality of LiDAR patch vectors to generate a plurality of classification (CLS) token embeddings. Finally, the processor-implemented method comprises training the multi-modal data fusion transformer model by performing a logistic regression on the generated plurality of CLS token embeddings.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
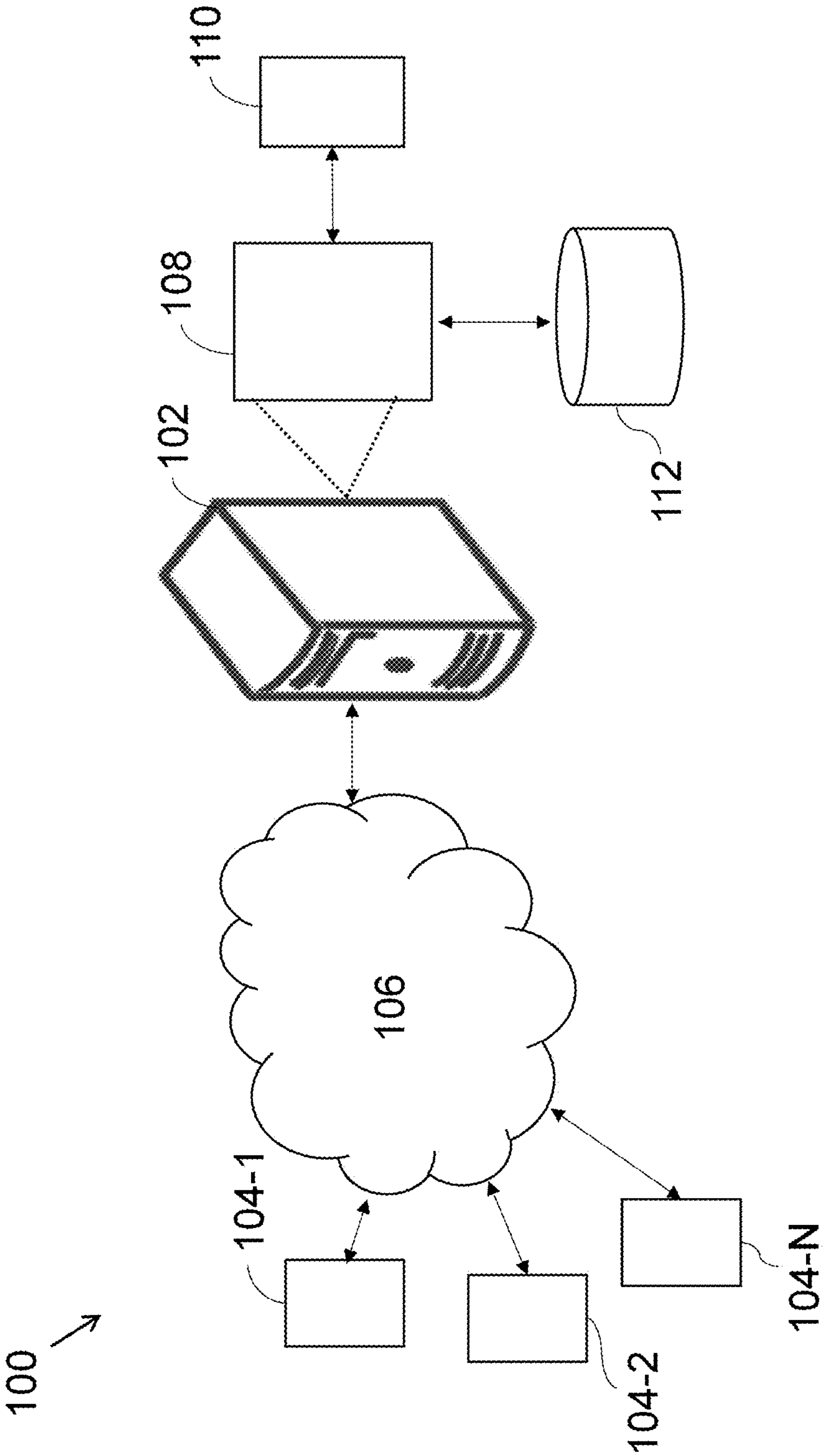
FIG. 1 illustrates an exemplary system for a distributed training of a multi-modal data fusion transformer, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

The ability to capture imagery with high spectral, spatial, and temporal resolution and using different modalities has led to an explosion of the remote sensing data. This has made the analysis of such multi-modal data computationally expensive in the remote-sensing domain. Thus, the challenge is twofold (1) systematic integration of multi-modal data for effective training, and (2) handling of large volume of data because of high resolution of the multiple modalities.

The hyperspectral data uses narrow band collection where bands are 10 nm wide or less. The number of bands for hyperspectral data are generally above 100. Other types of remote sensing known as active remote sensing generate energy such as microwaves synthetic aperture radar (SAR) or Light Detection and Ranging (LiDAR) and records the reflected energy from the objects to interpret them. Sensors such as SAR and LiDAR provide a range of information, that is, relative height of the objects.

These different modes gather earth observation with complementary perspectives. Because of physical limitations, not all types of information can be gathered by a single ideal sensor. For example, the hyperspectral data provides the detailed spectral information about the target at the cost of spatial resolution. SAR, because of the wavelength of the signal, can provide range/height information and texture of the surface in all weather conditions at the cost of spectral information (as the signal wavelength does not interact with the material at atomic or subatomic level). Hence, it becomes critical to use all the information about the target to make a better decision.

Combining multiple modes such as Hyperspectral Images (HSI) and LiDAR images pose significant challenges because of their different spatial resolution and mode of data capture. In particular, the HSI is notoriously large, leading to lengthy training times due to high dimensional of the data. The number of training samples required for the HSI training is large too (because of high dimensional of the data). Often, dimensionality reduction techniques such as Principal Component Analysis (PCA) are deployed. However, the reduction may result in loss of useful spectral information. As a result, novel approaches for processing and training on such data are required to derive useful insights in a timely manner. In traditional machine learning training, a single computer processes the data and computes model parameters. This can quickly become impractical as a single machine's memory is incapable of handling the large images/big data sets required for a multi-modal fusion.

A multi-modal data fusion transformer is a deep learning model that integrates information from multiple modalities, such as text, image, audio etc. to improve performance in various tasks, especially in the remote sensing domain. Recent efforts leverage a hyperspectral imaging and LiDAR sensors, and their complementary information about the target. Remote sensing image classification is inherently a transudative learning problem, requiring repeated model training (e.g., environment monitoring applications where changes occur on a daily or weekly basis). Hyperspectral data is typically high dimensional and massive and model training can take an impractical long time (several days to weeks). By reducing training time, it becomes possible to process larger amounts of data and develop more efficient and accurate models.

While the multi-modal fusion transformer model has been known to provide improved accuracy for predictions in remote sensing data, the size of data (images) is often a limiting factor in the training process. Large image sizes limit the number of images that can be used for training, and also increase overall training time. Additionally, multiple modalities imply that data comes from multiple sources, further increasing data size and consequently the training time.

A distributed training is a well-known technique and has been employed to speed up training in deep learning and metalearning architecture, both on bare-metal and cloud. The data distributed training is a technique used in artificial intelligence to train machine learning or deep learning models on massive data sets. Traditionally a single node (processor) was used to train the entire data. In data distributed training, the data is split across multiple computing nodes. These nodes work independently, processing their respective data partitions and computing the model parameters locally. The partial model parameters are then shared and aggregated across all nodes to create the final model. The data distributed training assists in accelerating the training process of complex models by using multiple computer resources thereby reducing the time it takes to train models. It enables organizations to train models on large data sets without having to invest in expensive hardware or specialized equipment.

The distributed training involves partitioning large image data into smaller subsets of patches in the first stage. In the second stage, the patches are distributed in multiple computing nodes for training based on their similarity. Intuition is the smaller patches would belong to the similar class. The disclosed invention exploits this association to optimize the training process and achieve the training with limited data set which is equivalent to full data set. Further, the embodiment addresses challenges associated with large image data and enables efficient training of multi-modal transformer-based models in the remote sensing domain, leading to more accurate and timely insight. However distributed training can also introduce challenges such as increased communication overhead between nodes, synchronization issues and the need for complex management of resources and data.

Embodiments herein provide a method and system for a distributed training of the multi-modal data fusion transformer. Herein, a distributed training approach called a Distributed Architecture for Fusion-Transformer Training Acceleration (DAFTA) is proposed for processing large multimodal remote sensing data. DAFTA is enabled to handle any combination of remote sensing modalities. Additionally, similarity of feature space is leveraged to optimize the training process and to achieve the training with reduced data set which is equivalent to a complete data set. The proposed approach provides a systematic and efficient method for managing large sensing data and enables accurate and timely insights for various applications.

Referring now to the drawings, and more particularly to FIG. 1 through FIG. 4, where similar reference characters denote corresponding features consistently throughout the figures, there are shown preferred embodiments, and these embodiments are described in the context of the following exemplary system and/or method.

FIG. 1 illustrates a block diagram of a system 100 for a distributed training of a multi-modal data fusion transformer, in accordance with an example embodiment. Although the present disclosure is explained considering that the system 100 is implemented on a server, it may be understood that the system 100 may comprise one or more computing devices 102, such as a laptop computer, a desktop computer, a notebook, a workstation, a cloud-based computing environment and the like. It will be understood that the system 100 may be accessed through one or more input/output interfaces 104-1, 104-2 . . . 104-N, collectively referred to as I/O interface 104. Examples of the I/O interface 104 may include, but are not limited to, a user interface, a portable computer, a personal digital assistant, a handheld device, a smartphone, a tablet computer, a workstation, and the like. The I/O interface 104 is communicatively coupled to the system 100 through a network 106.

In an embodiment, the network 106 may be a wireless or a wired network, or a combination thereof. In an example, the network 106 can be implemented as a computer network, as one of the different types of networks, such as virtual private network (VPN), intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network 106 may include a variety of network devices, including routers, bridges, servers, computing devices, storage devices. The network devices within the network 106 may interact with the system 100 through communication links.

The system 100 supports various connectivity options such as BLUETOOTH®, USB, ZigBee, and other cellular services. The network environment enables connection of various components of the system 100 using any communication link including Internet, WAN, MAN, and so on. In an exemplary embodiment, the system 100 is implemented to operate as a stand-alone device. In another embodiment, the system 100 may be implemented to work as a loosely coupled device to a smart computing environment. Further, the system 100 comprises at least one memory 110 with a plurality of instructions, one or more databases 112, and one or more hardware processors 108 which are communicatively coupled with the at least one memory 110 to execute a plurality of modules therein. The components and functionalities of the system 100 are described further in detail.

Further, the one or more hardware processors 108 are configured by the programmed instructions to consider a pixel as a word or token and a patch as a group of pixels surrounding the pixel in the image. Thus, the image is a collection of the patches. The patch can be a square or a rectangular in shape. Let each remote sensing (RS) mode of data capture represent an image, each with different visual/physical characteristics for the same scene. These images are treated equivalent to the description of the same scene written in different languages. Furthermore, the one or more hardware processors 108 are configured by the programmed instructions to consider the patch as a sentence. Thus, the multimodal data can be seen as the collection of sentences for the same topic.

It would be appreciated that instead of Adhoc task of learning a mapping between the mode-1 tokens (out of all the patch tokens) that are best mapped to mode-2 to learn classification (CLS) token embeddings, a better pretext task is defined to learn the CLS token embeddings. The CLS tokens are learned for translation between two patches. Thus, the CLS token embeddings are learned in such a way that the abstract embeddings may represent both sentences. In other words, the CLS token embeddings are intermediate common representations learned for both the modes. Further, the one or more hardware processors 108 are configured by the programmed instructions to project the patches from both the modes (patch vector/sentences) in some hypothetical space applying same learnable projection matrix. Further, the one or more hardware processors 108 are configured by the programmed instructions to do the same thing for CLS token vector. Learn CLS embeddings in new space such that it represents the projected common representation (all this for correct answers on patch level task). Then throw away the rest and use the CLS embeddings for softmax classification (this needs to be verified). Any such mechanism can be designed which encourages the common representation learning.

Figure 2:
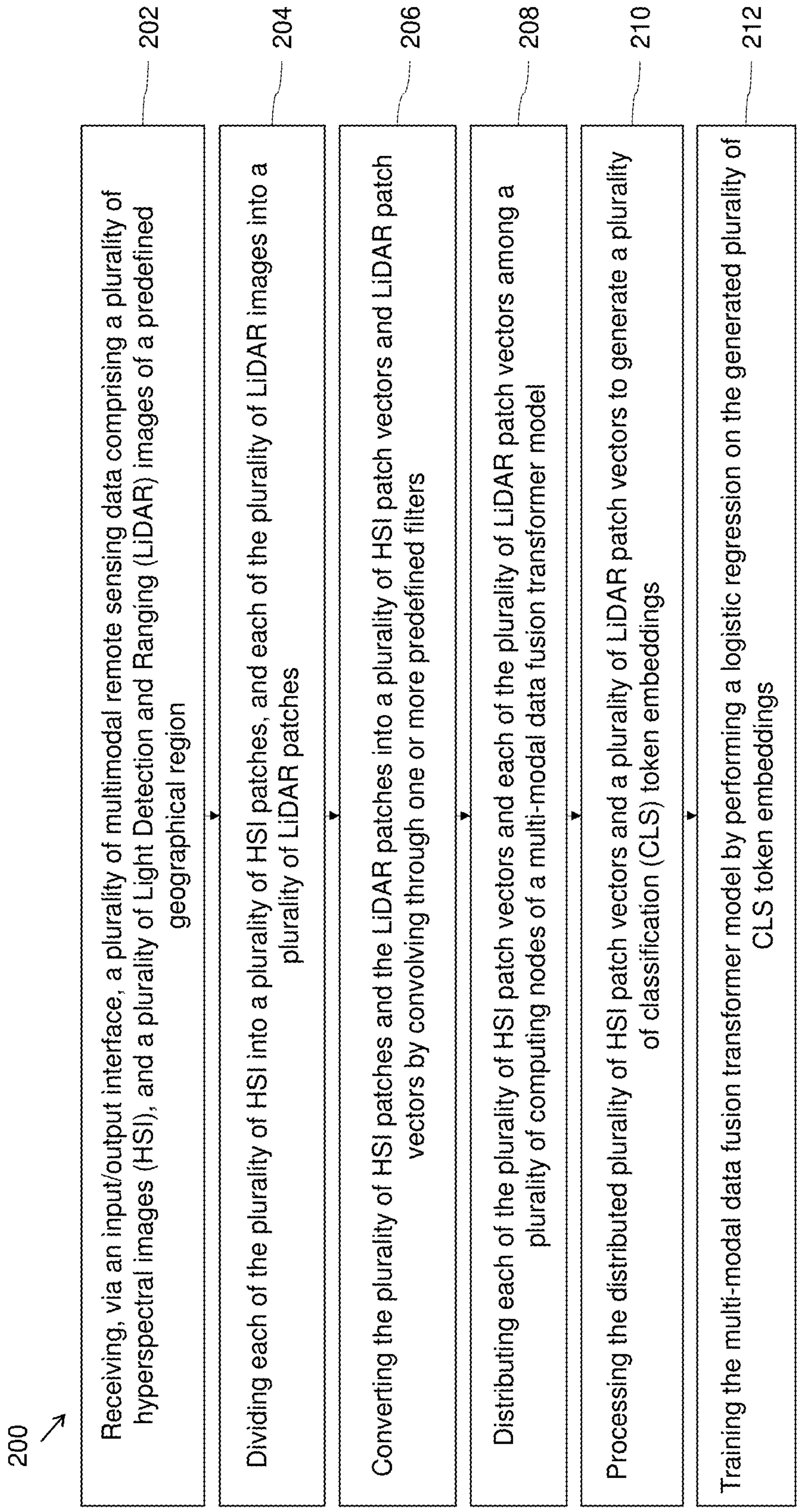
FIG. 2 is an exemplary flow diagram illustrating a processor-implemented method for a distributed training of a multi-modal data fusion transformer, according to some embodiments of the present disclosure.

FIG. 2 is a flow diagram illustrating a processor-implemented method 200 for a distributed training of a multi-modal data fusion transformer implemented by the system 100 of FIG. 1. Functions of the components of the system 100 are now explained through steps of flow diagram in FIG. 2, according to some embodiments of the present disclosure.

Initially, at step 202 of the processor-implemented method 200, the one or more hardware processors 108 are configured by the programmed instructions to receive, via an input/output interface, a plurality of multimodal remote sensing data comprising a plurality of hyperspectral (HS) images, and a plurality of Light Detection and Ranging (LIDAR) images of a predefined geographical region.

At the next step 204 of the processor-implemented method 200, the one or more hardware processors 108 are configured by the programmed instructions to divide each of the plurality of hyperspectral images (HSI) into a plurality of HSI patches, and each of the plurality of (LiDAR images into a plurality of LiDAR patches.

Figure 3:
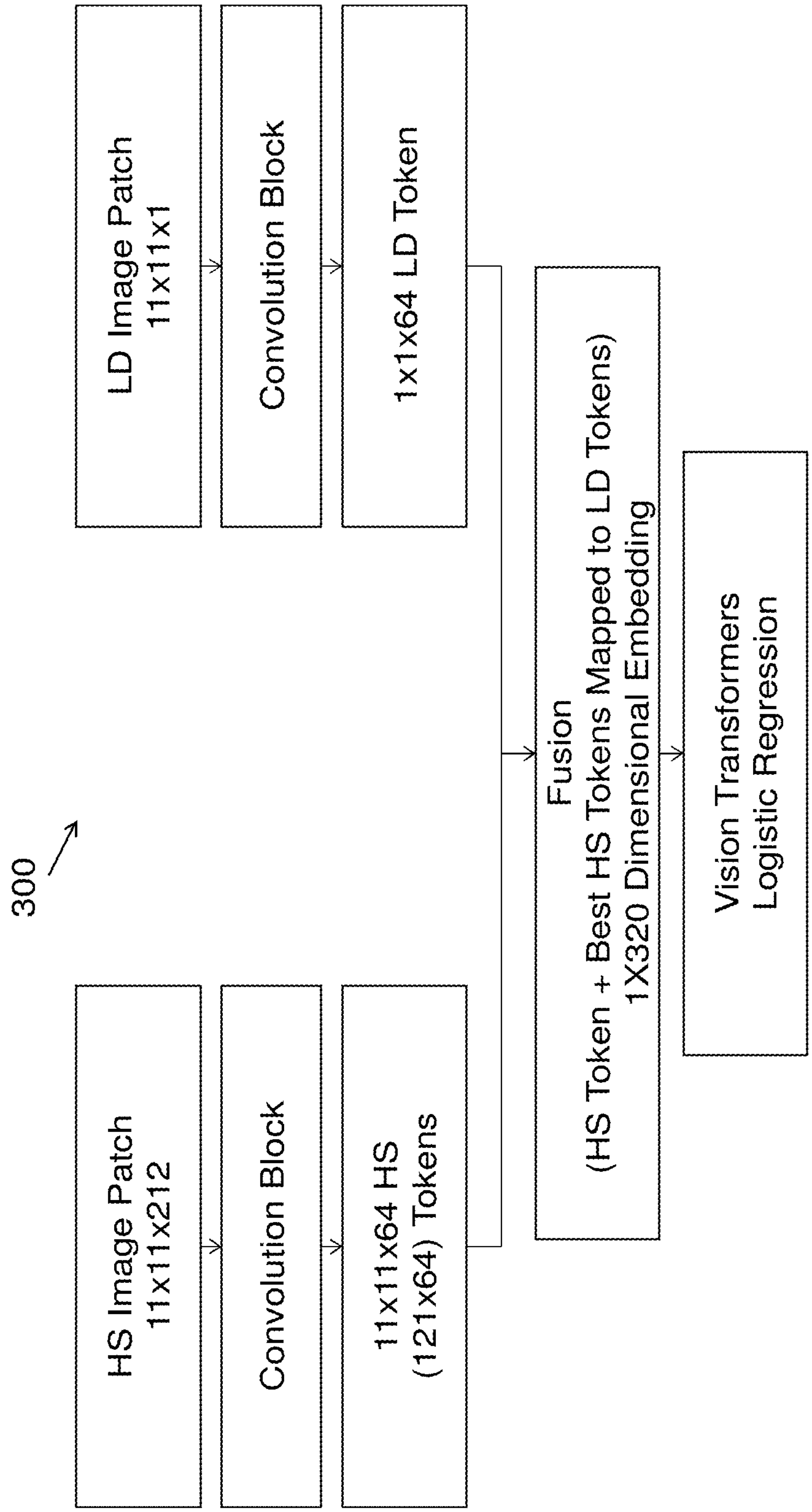
FIG. 3 is a functional block diagram illustrating multi-modal fusion implemented by the system 100 of FIG. 1, according to some embodiments of the present disclosure.

FIG. 3 is a block diagram illustrating multi-modal fusion implemented by the system 100 of FIG. 1. Combining multiple modes such as hyperspectral (HS) and light detection and ranging (LiDAR) pose significant challenges because of their different spatial resolution and mode of data capture. In particular, Hyperspectral image (HSI) is notoriously large, leading to lengthy training times due to high dimensional of the data.

It is to be noted that the hyperspectral image data uses narrow band collection where bands are 10 nm wide or less. The number of bands for hyperspectral data are generally above 100. Other types of remote sensing known as active remote sensing generate energy such as microwaves (synthetic aperture radar-SAR) or Laser and records the reflected energy from the objects to interpret them. Sensors such as SAR and LiDAR provide a range of information, that is, relative height of the objects.

These different modes gather earth observation with complementary perspectives. Because of physical limitations not all types of information can be gathered by a single ideal sensor. For example, the hyperspectral data provides the detailed spectral information about the target at the cost of spatial resolution. SAR, because of the wavelength of the signal, can provide range/height information and texture of the surface in all weather conditions at the cost of spectral information (as the signal wavelength does not interact with the material at atomic or subatomic level). Hence it becomes critical to use all the information about the target to make a better decision.

The one or more hardware processors 108 are configured by the programmed instructions to model an image as a visual document for the distributed computing especially fusion. The model provides the underlying framework for achieving the fusion of the multimodal data.

Referring again the FIG. 2, at the next step 206 of the processor-implemented method 200, the one or more hardware processors 108 are configured by the programmed instructions to convert the plurality of HSI patches and the LiDAR patches into a plurality of HSI patch vectors and LiDAR patch vectors, respectively by convolving through one or more predefined filters.

At the next step 208 of the processor-implemented method 200, the one or more hardware processors 108 are configured by the programmed instructions to distribute each of the plurality of HSI patch vectors and each of the plurality of LiDAR patch vectors among a plurality of computing nodes of a multi-modal data fusion transformer model.

A computing node is a typical compute node which may be CPU or GPU based. Each of the plurality of computing node is loaded with a subset of the plurality of patches of the received images. As a result, multiple nodes may house a single image in the form of patches. In this manner all patches of images in the data set are distributed across multiple nodes. This setup enables training with a larger number of images and with a reduction in training time without compromising the accuracy.

A Distributed Architecture for Fusion-Transformer training Acceleration (DAFTA) is a distributed-training approach that distributes patches of large remote sensing images and enables training of fusion-transformer models that in a computationally inexpensive manner. The DAFTA is an architecture that aims to reduce the overall training time of multi-model fusion transformer models and consistently maintain desired accuracy in the remote sensing domain.

Each of the plurality of computing nodes hosts a copy of the fusion transformed model and a subset of the plurality of the patches of an image. Initially, the each of the plurality of patches are distributed across each of the plurality of computing nodes. In a single epoch, each computing node will iterate over all the plurality of patches present at the computing node, by sampling batches of a user-defined batch size and training a local copy of the model. Once the iterations are complete (i.e., all the batches on each of the nodes have been sampled), the gradients across the nodes are averaged, and each node updates the local copy of the model. This implies that a single epoch is complete. When a new epoch begins, this process is repeated till the model converges.

In one illustration, a typical image may have 242 bands and 3000×252 column i.e., 400 MB in size. As result in a serial training setup, the number of images used to train a model may be limited, because of increase in training time. Each of the plurality of patches of the HSI image and LiDAR is represented by 121 tokens. The HSI patches and the LiDAR tokens are converted to 64 dimensional vectors (64 feature maps) by convolving them through various filters.

Figure 4:
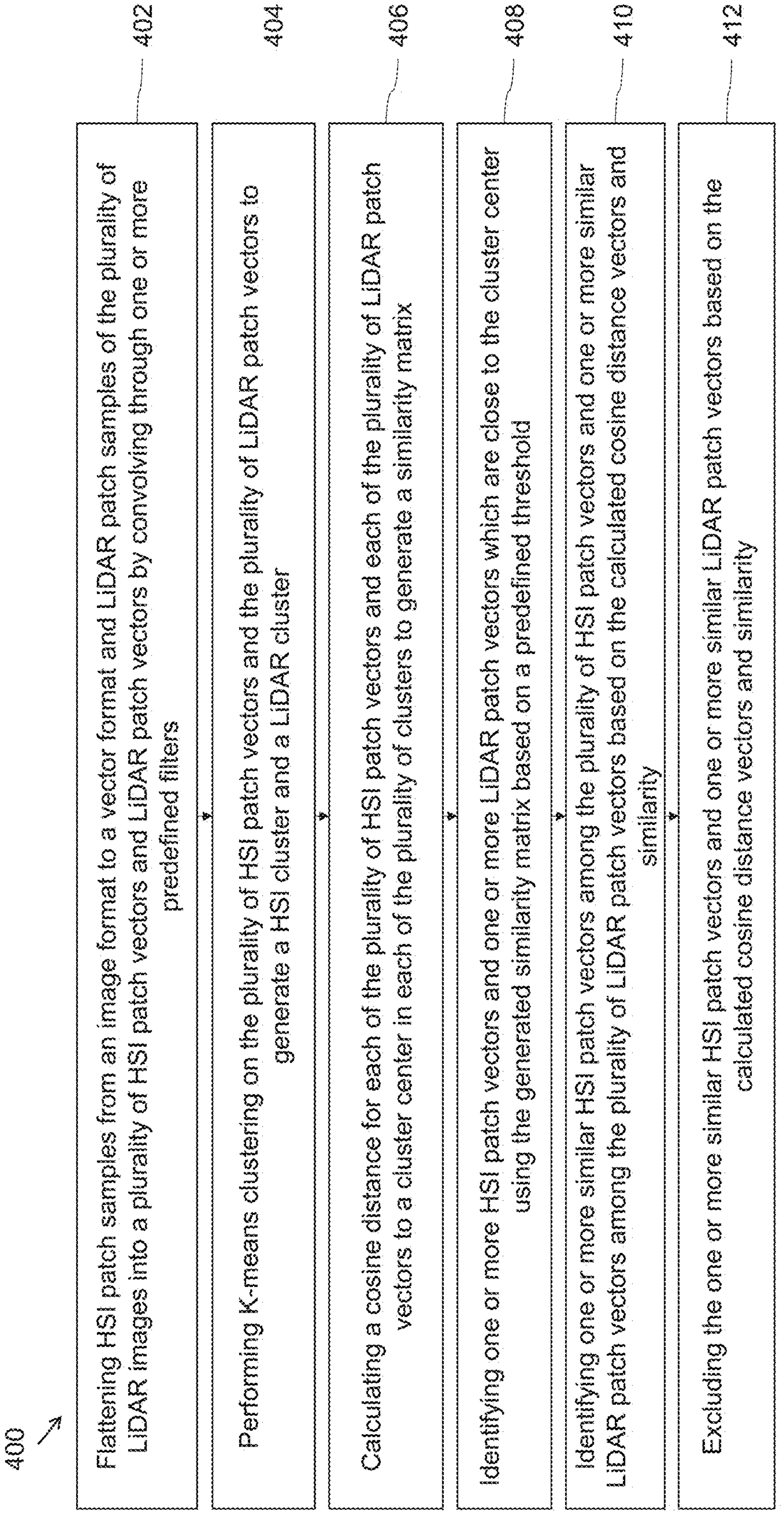
FIG. 4 is a flow diagram illustrating a processor-implemented method 400 for a similarity-based approach to identify similarity across the patches to determine a sub-set of the overall large image data set implemented by the system 100 of FIG. 1, according to some embodiments of the present disclosure.

FIG. 4 is a flow diagram illustrating a processor-implemented method 400 for a similarity-based approach to identify similarity across the patches to determine a sub-set of the overall large image data set implemented by the system 100 of FIG. 1. Herein, a similarity-based approach is leveraged to identify similarity across the patches to determine a sub-set of the overall large image data set, leading to reduced training time for the model, without compromising the accuracy. In HSI classification, especially pixel-based classification, the local neighborhood of the pixel is considered to be the feature space for two-dimensional (2-D) or three-dimensional (3-D) convolution. The local neighborhood, referred to as a patch, are pixels within a window of n×n rows and columns around the pixel. Pixels with same class tend to exhibit similar features space. Thus, pixels having similar features tend to belong to the same class. Thus, the one or more hardware processors 108 are configured by the programmed instructions to leverage patch similarity in order to improve the efficiency and accuracy of the classification process.

Initially at step 402, the one or more hardware processors 108 are configured by the programmed instructions to flatten a plurality of HSI patch samples of the plurality of hyperspectral (HS) images from an image format to a vector format and a plurality of LiDAR patch samples of the plurality of Light Detection and Ranging (LiDAR) images into a plurality of HSI patch vectors and LiDAR patch vectors by convolving through one or more predefined filters.

At the next step 404, the one or more hardware processors 108 are configured by the programmed instructions to perform a K-means clustering on the plurality of HSI patch vectors and the plurality of LiDAR patch vectors to generate a HSI cluster and a LiDAR cluster. A cosine distance is calculated for each of the plurality of HSI patch vectors and each of the plurality of LiDAR patch vectors to a cluster center in each of a plurality of clusters to generate a similarity matrix at the next step 406.

At the next step 408, the one or more hardware processors 108 are configured by the programmed instructions to identify one or more HSI patch vectors and one or more LiDAR patch vectors which are close to the cluster center using the generated similarity matrix based on a predefined threshold. The one or more similar HSI patch vectors among the plurality of HSI patch vectors and one or more similar LiDAR patch vectors among the plurality of LiDAR patch vectors are identified at the next step 410 and excluded based on the calculated cosine distance vectors and similarity at the last step 412.

In one example, a K-Nearest Neighbors (KNN) based clustering approach is employed to identify and eliminate similar patches that belonged to the same class. As a result, approximately 30% of the patches are removed based on a predefined threshold and a reduced data set is obtained. Further, a fusion transformer model is trained on DAFTA using the obtained reduced data sets. It would be appreciated that when experiments are conducted to compare the accuracy and the training time with the original data set, a significant reduction is achieved in computational cost and consequently a reduction in overall training time.

Referring again the FIG. 2, at the next step 210 of the method 200, the one or more hardware processors 108 are configured by the programmed instructions to process the distributed plurality of HSI patch vectors and a plurality of LiDAR patch vectors to generate a plurality of classification (CLS) token embeddings. Wherein, the processing of the distributed plurality of HSI patch vectors and a plurality of LiDAR patch vectors comprises steps as follows.

In another aspect, the one or more hardware processors 108 are configured by the programmed instructions to perform convolution through one or more predefined filters on the HSI patch vectors and LiDAR path vectors to generate a plurality of 64-dimensional HS feature vector and a plurality of 64-dimensional LiDAR feature vectors respectively. It is to be noted that the HS feature vectors, and LiDAR feature vectors can be generated of any dimensional. Further, the one or more hardware processors 108 are configured by the programmed instructions to determine a common representation of the HS feature vectors, and LiDAR feature vector. Herein, the common representation is to represent both the feature vectors processed so far. Furthermore, the one or more hardware processors 108 are configured by the programmed instructions to define pre-text task to learn CLS token embeddings (320-dimensional vector) using a predefined linguistic model.

Finally, at the last step 212 of the method 200, the one or more hardware processors 108 are configured by the programmed instructions to train the multi-modal data fusion transformer model by performing a logistic regression on the generated plurality of CLS token embeddings associated with a plurality of class labels.

Experiment

A CPU-based setup is considered as the CPUs are easily accessible and also enable us to demonstrate the efficiency of the disclosed invention in a low-cost resource-constrained environment. The impact of increasing the number of nodes on the training time is investigated for different batch sizes and compared it with the serial-training approach. A significant decrease (4×) in training time is observed as the number of nodes are increased without compromising on privacy. These findings are further validated by conducting ablation studies across modalities. Further, the patch-similarity approach is also evaluated and found to be effective in a distributed setup. To reinforce results, the experiment is repeated on the Houston data set, and consistent results are obtained on the Trento data set.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problems associated with a systematic integration of multi-modal data for effective training, and handling of large volume of data because of high resolution of the multiple modalities. Embodiments herein further provide a method and system for a distributed training of a multi-modal data fusion transformer. Herein, a distributed training approach called a Distributed Architecture for Fusion-Transformer Training Acceleration (DAFTA) is proposed for processing large multimodal remote sensing data. DAFTA is enabled to handle any combination of remote sensing modalities. Additionally, similarity of feature space is leveraged to optimize the training process and to achieve the training with reduced data set which is equivalent to a complete data set. The proposed approach provides a systematic and efficient method for managing large sensing data and enables accurate and timely insights for various applications.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method for a distributed training of a multi-modal data fusion transformer, comprising:

receiving, via an input/output interface, a plurality of multimodal remote sensing data comprising a plurality of hyperspectral (HS) images, and a plurality of Light Detection and Ranging (LiDAR) images of a predefined geographical region;

dividing, via a one or more hardware processors, each of the plurality of hyperspectral images (HSI) into a plurality of HSI patches, and each of the plurality of LiDAR images into a plurality of LiDAR patches;

converting, via the one or more hardware processors, the plurality of HSI patches and the LiDAR patches into a plurality of HSI patch vectors and a plurality of LiDAR patch vectors, respectively, by convolving through one or more predefined filters;

distributing, via the one or more hardware processors, each of the plurality of HSI patch vectors and each of the plurality of LiDAR patch vectors among a plurality of computing nodes of a multi-modal data fusion transformer model;

processing, via the one or more hardware processors, the distributed plurality of HSI patch vectors and the plurality of LiDAR patch vectors to generate a plurality of classification (CLS) token embeddings, wherein the processing of the distributed plurality of HSI patch vectors and the plurality of LiDAR patch vectors includes:

selecting, via the one or more hardware processors, a 64-dimensional HS feature vector from the plurality of 64-dimensional HS feature vectors;

determining, via the one or more hardware processors, a common representation of the selected 64-dimensional HS feature vector, and the plurality of LiDAR feature vectors, wherein the common representation is to represent both the feature vectors processed so far;

defining, via the one or more hardware processors, pre-text task to learn CLS token embeddings based on the determined common representation of the selected HS feature vector and the plurality of LiDAR feature vectors using a predefined linguistic model, wherein the CLS token embeddings are intermediate common representations, the plurality of HSI patches and the LiDAR patches are projected from the plurality of HSI patch vectors and the plurality of LiDAR patch vectors or sentences in a hypothetical space thereby representing a projected common representation, and a learned CLS embedding are considered for softmax classification; and training, via one or more hardware processors, the multi-modal data fusion transformer model by performing a logistic regression on the generated plurality of CLS token embeddings.

2. The processor-implemented method of claim 1, further comprising:

flattening, via the one or more hardware processors, a plurality of HSI patch samples of the plurality of hyperspectral (HS) images from an image format to a vector format and a plurality of LiDAR patch samples of the plurality of LiDAR images into a plurality of HSI patch vectors and LiDAR patch vectors respectively by convolving through one or more predefined filters;

performing, via the one or more hardware processors, K-means clustering on the plurality of HSI patch vectors and the plurality of LiDAR patch vectors to generate a HSI cluster and a LiDAR cluster, respectively;

calculating, via the one or more hardware processors, a cosine distance for each of the plurality of HSI patch vectors and each of the plurality of LiDAR patch vectors to a cluster center in each of a plurality of clusters to generate a similarity matrix;

identifying, via the one or more hardware processors, one or more HSI patch vectors and one or more LiDAR patch vectors which are close to the cluster center using the generated similarity matrix based on a predefined threshold;

identifying, via the one or more hardware processors, one or more similar HSI patch vectors among the plurality of HSI patch vectors and one or more similar LiDAR patch vectors among the plurality of LiDAR patch vectors based on the calculated cosine distance vectors and similarity; and excluding, via the one or more hardware processors, the one or more similar HSI patch vectors among the plurality of HSI patch vectors and the one or more similar LiDAR patch vectors among the plurality of LiDAR patch vectors based on the calculated cosine distance vectors and similarity.

3. The processor-implemented method of claim 1, wherein the step of selecting the 64-dimensional HS feature vector from the plurality of 64-dimensional HS feature vectors is preceded by:

performing, via the one or more hardware processors, convolution through one or more predefined filters on the plurality of HSI patch vectors to generate a plurality of 64-dimensional HS feature vector;

performing, via the one or more hardware processors, convolution through one or more predefined filters on the plurality of LiDAR path vectors to generate a plurality of 64-dimensional LiDAR feature vectors; and mapping, via the one or more hardware processors, the generated plurality of 64-dimensional HS feature vectors with the generated plurality of 64-dimensional LiDAR feature vectors.

4. A system for a distributed training of a multi-modal data fusion transformer, comprising:

an input/output interface, to receive a plurality of multi-modal remote sensing data comprising a plurality of hyperspectral (HS) images, and a plurality of Light Detection and Ranging (LiDAR) images of a pre-defined geographical region;

a memory in communication with the one or more hardware processors, wherein the one or more hardware processors are configured to execute programmed instructions stored in the memory to:

divide each of the plurality of hyperspectral images (HSI) into a plurality of HSI patches, and each of the plurality of LiDAR images into a plurality of LiDAR patches;

convert the plurality of HSI patches and the LiDAR patches into a plurality of HSI patch vectors and a plurality of LiDAR patch vectors respectively by convolving through one or more predefined filters;

distribute each of the plurality of HSI patch vectors and each of the plurality of LiDAR patch vectors among a plurality of computing nodes of a multi-modal data fusion transformer model;

process the distributed plurality of HSI patch vectors and the plurality of LiDAR patch vectors to generate a plurality of classification (CLS) token embeddings, wherein the processing of the distributed plurality of HSI patch vectors and the plurality of LiDAR patch vectors includes:

selecting, via the one or more hardware processors, a 64-dimensional HS feature vector from the plurality of 64-dimensional HS feature vectors;

determining, via the one or more hardware processors, a common representation of the selected 64-dimensional HS feature vector, and the plurality of LiDAR feature vectors, wherein the common representation is to represent both the feature vectors processed so far;

defining, via the one or more hardware processors, pre-text task to learn CLS token embeddings based on the determined common representation of the selected HS feature vector and the plurality of LiDAR feature vectors using a predefined linguistic model, wherein the CLS token embeddings are intermediate common representations, the plurality of HSI patches and the LiDAR patches are projected from the plurality of HSI patch vectors and the plurality of LiDAR patch vectors or sentences in a hypothetical space thereby representing a projected common representation, and a learned CLS embedding are considered for softmax classification; and train the multi-modal data fusion transformer model by performing a logistic regression on the generated plurality of CLS token embeddings.

5. The system of claim 4, further comprising:

flattening, via the one or more hardware processors, a plurality of HSI patch samples of the plurality of hyperspectral (HS) images from an image format to a vector format and a plurality of LiDAR patch samples of the plurality of LiDAR images into a plurality of HSI patch vectors and LiDAR patch vectors by convolving through one or more predefined filters;

performing, via the one or more hardware processors, K-means clustering on the plurality of HSI patch vectors and the plurality of LiDAR patch vectors respectively to generate a HSI cluster and a LiDAR cluster;

calculating, via the one or more hardware processors, a cosine distance for each of the plurality of HSI patch vectors and each of the plurality of LiDAR patch vectors respectively to a cluster center in each of a plurality of clusters to generate a similarity matrix;

identifying, via the one or more hardware processors, one or more HSI patch vectors and one or more LiDAR patch vectors respectively which are close to the cluster center using the generated similarity matrix based on a predefined threshold;

identifying, via the one or more hardware processors, one or more similar HSI patch vectors among the plurality of HSI patch vectors and one or more similar LiDAR patch vectors among the plurality of LiDAR patch vectors respectively based on the calculated cosine distance vectors and similarity; and excluding, via the one or more hardware processors, the one or more similar HSI patch vectors among the plurality of HSI patch vectors and one or more similar LiDAR patch vectors among the plurality of LiDAR patch vectors respectively based on the calculated cosine distance vectors and similarity.

6. The system of claim 4, wherein the step of selecting the 64-dimensional HS feature vector from the plurality of 64-dimensional HS feature vectors is preceded by:

performing, via the one or more hardware processors, convolution through one or more predefined filters on the plurality of HSI patch vectors to generate a plurality of 64-dimensional HS feature vector;

performing, via the one or more hardware processors, convolution through one or more predefined filters on the plurality of LiDAR path vectors to generate a plurality of 64-dimensional LiDAR feature vectors; and mapping, via the one or more hardware processors, the generated plurality of 64-dimensional HS feature vector with the generated plurality of 64-dimensional LiDAR feature vectors.

7. One or more non-transitory machine-readable information storage mediums comprising one or more instructions which when executed by one or more hardware processors cause:

receiving, via an input/output interface, a plurality of multimodal remote sensing data comprising a plurality of hyperspectral (HS) images, and a plurality of Light Detection and Ranging (LiDAR) images of a pre-defined geographical region;

dividing each of the plurality of hyperspectral images (HSI) into a plurality of HSI patches, and each of the plurality of LiDAR images into a plurality of LiDAR patches;

converting the plurality of HSI patches and the LiDAR patches into a plurality of HSI patch vectors and a plurality of LiDAR patch vectors, respectively, by convolving through one or more predefined filters;

distributing each of the plurality of HSI patch vectors and each of the plurality of LiDAR patch vectors among a plurality of computing nodes of a multi-modal data fusion transformer model;

processing, via the one or more hardware processors, the distributed plurality of HSI patch vectors and the plurality of LiDAR patch vectors to generate a plurality of classification (CLS) token embeddings, wherein the processing of the distributed plurality of HSI patch vectors and the plurality of LiDAR patch vectors includes:

selecting, via the one or more hardware processors, a 64-dimensional HS feature vector from the plurality of 64-dimensional HS feature vectors;

determining, via the one or more hardware processors, a common representation of the selected 64-dimensional HS feature vector, and the plurality of LiDAR feature vectors, wherein the common representation is to represent both the feature vectors processed so far;

defining, via the one or more hardware processors, pre-text task to learn CLS token embeddings based on the determined common representation of the selected HS feature vector and the plurality of LiDAR feature vectors using a predefined linguistic model, wherein the CLS token embeddings are intermediate common representations, the plurality of HSI patches and the LiDAR patches are projected from the plurality of HSI patch vectors and the plurality of LiDAR patch vectors or sentences in a hypothetical space thereby representing a projected common representation, and a learned CLS embedding are considered for softmax classification; and training the multi-modal data fusion transformer model by performing a logistic regression on the generated plurality of CLS token embeddings.

8. The one or more non-transitory machine-readable information storage mediums of claim 7, further comprising:

flattening a plurality of HSI patch samples of the plurality of hyperspectral (HS) images from an image format to a vector format and a plurality of LiDAR patch samples of the plurality of LiDAR images into a plurality of HSI patch vectors and LiDAR patch vectors respectively by convolving through one or more predefined filters;

performing K-means clustering on the plurality of HSI patch vectors and the plurality of LiDAR patch vectors to generate a HSI cluster and a LiDAR cluster, respectively;

calculating a cosine distance for each of the plurality of HSI patch vectors and each of the plurality of LiDAR patch vectors to a cluster center in each of a plurality of clusters to generate a similarity matrix;

identifying one or more HSI patch vectors and one or more LiDAR patch vectors which are close to the cluster center using the generated similarity matrix based on a predefined threshold;

identifying one or more similar HSI patch vectors among the plurality of HSI patch vectors and one or more similar LiDAR patch vectors among the plurality of LiDAR patch vectors based on the calculated cosine distance vectors and similarity; and excluding the one or more similar HSI patch vectors among the plurality of HSI patch vectors and the one or more similar LiDAR patch vectors among the plurality of LiDAR patch vectors based on the calculated cosine distance vectors and similarity.

9. The one or more non-transitory machine-readable information storage mediums of claim 7, wherein the step of selecting the 64-dimensional HS feature vector from the plurality of 64-dimensional HS feature vectors is preceded by:

performing convolution through one or more predefined filters on the plurality of HSI patch vectors to generate a plurality of 64-dimensional HS feature vector;

performing convolution through one or more predefined filters on the plurality of LiDAR path vectors to generate a plurality of 64-dimensional LiDAR feature vectors; and mapping the generated plurality of 64-dimensional HS feature vectors with the generated plurality of 64-dimensional LiDAR feature vectors.

* * * * *